United States Patent [19]

Evans

[11] Patent Number: 4,494,416
[45] Date of Patent: Jan. 22, 1985

[54] INFINITE SPEED TRANSMISSION WITH RECIPROCATING YOKES

[76] Inventor: Lyle B. Evans, 9135 SW. Summerfield Ct., Tigard, Oreg. 97223

[21] Appl. No.: 416,885

[22] Filed: Sep. 13, 1982

[51] Int. Cl.³ .................. F16H 29/08; F16H 29/20; F16H 27/10
[52] U.S. Cl. ........................... 74/119; 74/121; 74/125.5
[58] Field of Search ............ 74/63, 121, 119, 55, 74/29, 30, 125.5, 570, 117, 118, 120

[56] References Cited

U.S. PATENT DOCUMENTS

| | | | |
|---|---|---|---|
| 546,055 | 9/1895 | Pitt | 74/567 X |
| 1,050,226 | 1/1913 | Nixon | 74/55 |
| 1,090,401 | 1/1914 | Lea | 74/55 |
| 1,872,636 | 8/1932 | Greening et al. | 74/63 |
| 1,998,945 | 4/1935 | Stein | 74/121 |
| 2,275,156 | 3/1942 | Moorhouse | 74/119 |
| 2,936,632 | 5/1960 | Palmer | 74/55 X |
| 3,427,888 | 2/1969 | Rheinlander | 74/55 |
| 3,459,056 | 8/1969 | Lea | 74/29 |
| 3,722,305 | 3/1973 | Walters et al. | 74/63 X |
| 3,750,485 | 8/1973 | Blakemore | 74/63 X |
| 4,413,961 | 11/1983 | Griffin | 74/63 X |

FOREIGN PATENT DOCUMENTS 683422  6/1930  France .................. 74/121

*Primary Examiner*—Allan D. Herrmann
*Assistant Examiner*—Stephen B. Andrews
*Attorney, Agent, or Firm*—James D. Givnan, Jr.

[57] ABSTRACT

Cams carried by a power input shaft reciprocate a pair of yokes along perpendicular paths with the ends of each yoke coupled to a pair of oscillating arm members, all carried by a shift ring. Disposed for rectilinear travel between each pair of arm members is a gear plate. Rack gears on the gear plates impart rotation to driven gears of multiple drive assemblies, each of which assemblies includes a driving gear in mesh with an output shaft mounted gear. Rectilinear movement of the gear plates in one direction in response to arm oscillation imparts rotation to the driving gear of each drive assembly while a unidirectional clutch in each drive assembly permits overrunning of the driving gear during return travel of its associated gear plate. Infinite speed changes result from shifting the axes of arm oscillation toward or away from the gear plate ends by positioning of the arm carrying shift ring. Modified gear plates include end mounted bearings of semi-circular shape which ride on arm member curved inner surfaces.

13 Claims, 6 Drawing Figures

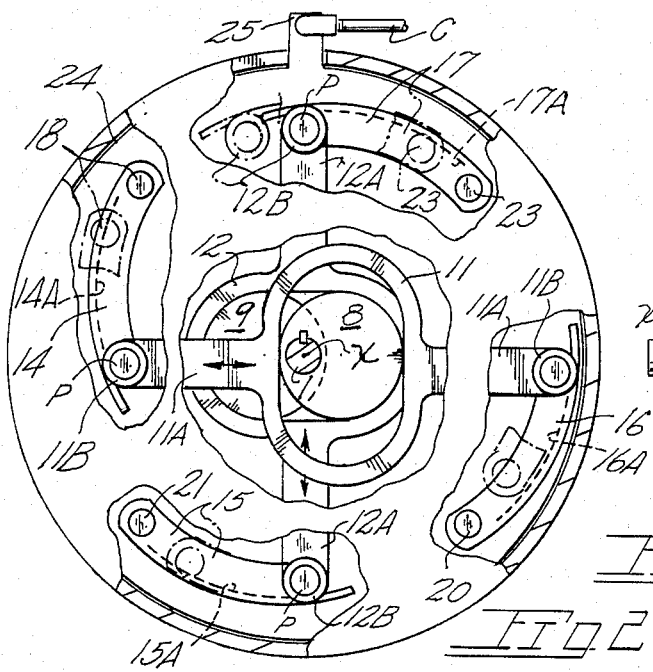
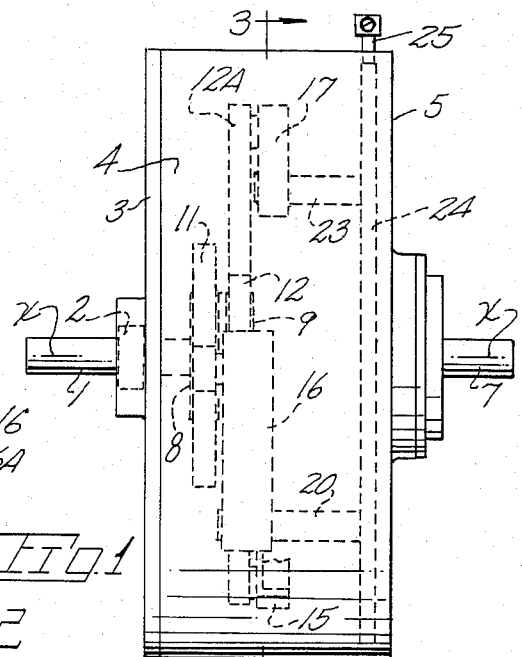
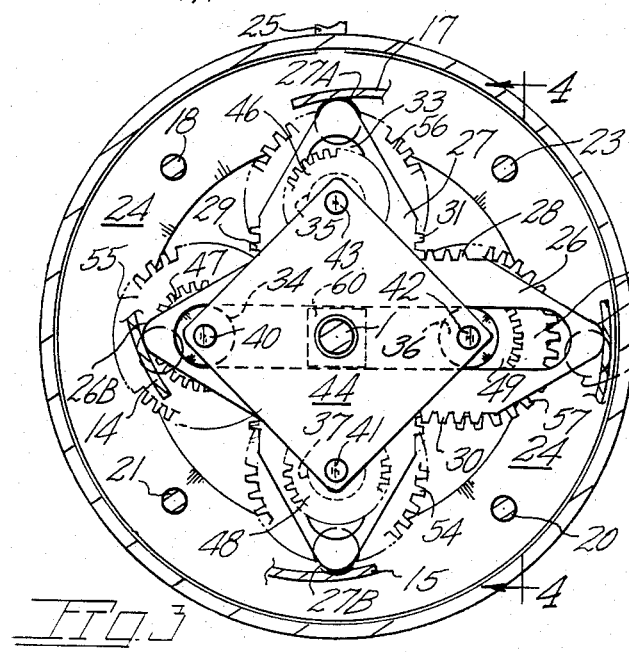
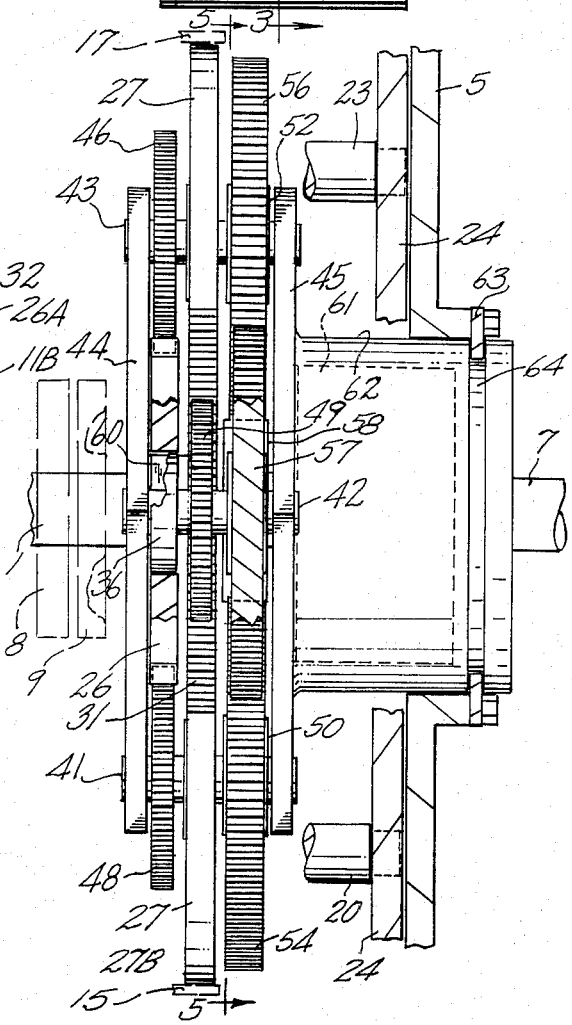
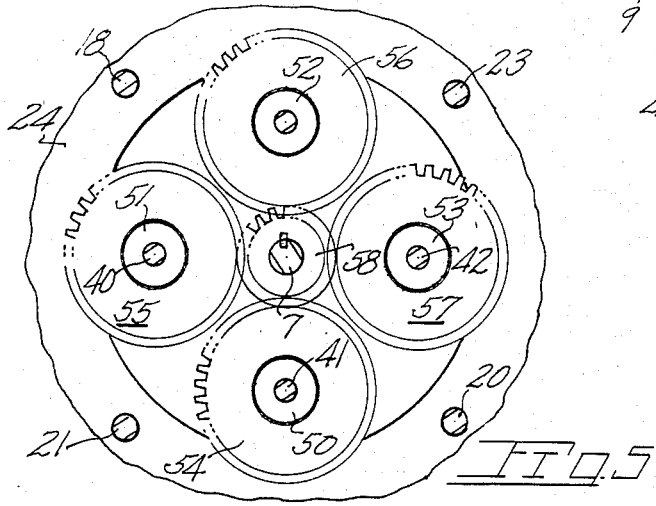

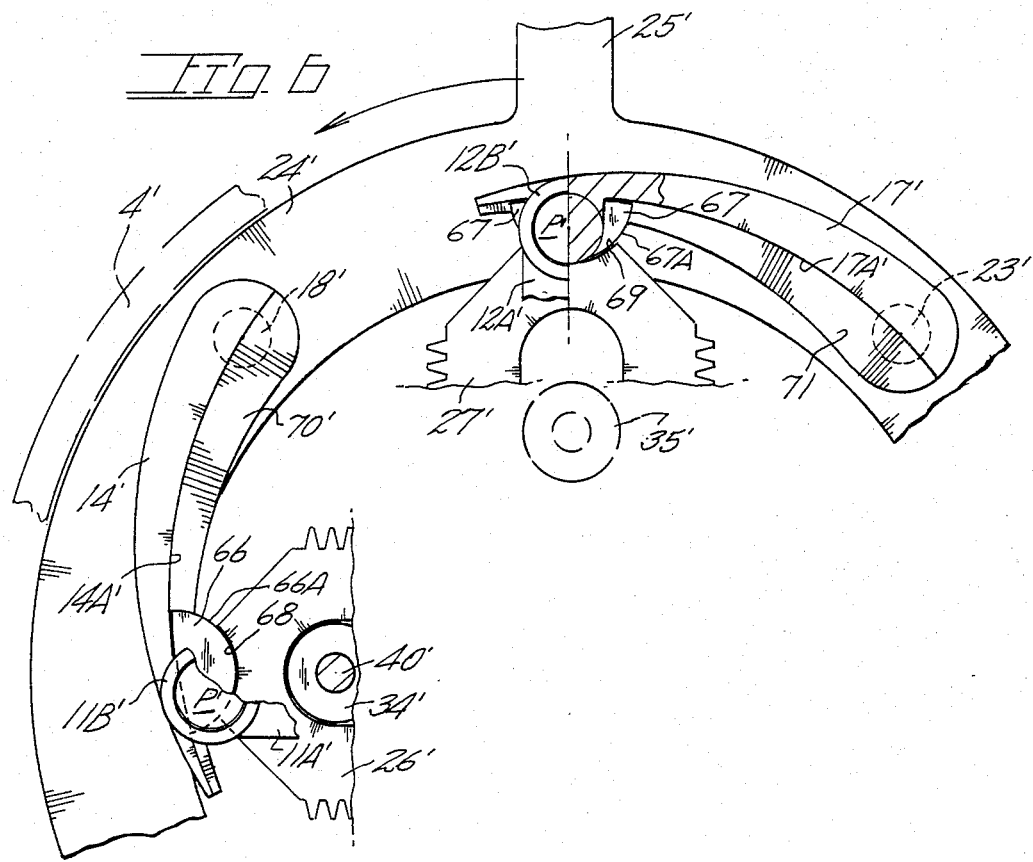

INFINITE SPEED TRANSMISSION WITH RECIPROCATING YOKES

BACKGROUND OF THE INVENTION

The present invention pertains generally to transmissions and particularly to a transmission for infinite speed changes.

Recent developments in mechanical transmissions, as opposed to fluid using transmissions, have been directed toward providing such a transmission with infinite speed ratios between input and output components to permit a power source to operate at all times at its most efficient speed. A shortcoming of known infinite speed transmissions is the use of belts or the like susceptible to rapid wear and, hence, periodic attention.

In the known prior art, U.S. Pat. No. 3,427,888 discloses a transmission wherein a pair of gear racks drive clutch equipped gears carried by an output shaft. Rectilinear movement is imparted to the gear racks by cams the eccentricity of which may be varied to impart strokes of different lengths to the reciprocating gear racks. According to the patent disclosure, the input and output shafts of the transmission are necessarily offset. A further drawback is that the transmission does not lend itself to enclosure within a housing of practical size.

U.S. Pat. No. 546,055 discloses a steam engine having driven cams carried by a common shaft with each cam rotating in a separate yoke to impart rotation to the cam equipped output shaft.

U.S. Pat. No. 2,936,632 discloses a device for driving the pistons of a machine such as an air compressor which utilizes eccentrics and yoke structures disposed perpendicularly to one another.

U.S. Pat. No. 1,050,226 discloses the concept of a cam actuated rod coupled to a yoke on which parallel rows of gear teeth sequentially drive an output shaft via a pair of unidirectional clutches.

U.S. Pat. No. 3,459,056 discloses a transmission wherein a pair of gear racks move in rectilinear alternating fashion to drive a crank equipped output shaft.

SUMMARY OF THE PRESENT INVENTION

The present invention is embodied within an infinite speed transmission having oscillating arm members imparting rectilinear movement to rack gear equipped plates.

Briefly, the present transmission utilizes multiple cam driven yokes with the yokes each driving oscillating pairs of arms which in turn impart reciprocal movement to gear plates equipped with rack gears. Driven by the reciprocating gear plates are clutch equipped gears which function in a unidirectional manner to each drive a cluster gear which ultimately drives a gear equipped output shaft. Gear plate travel is in rectilinear fashion along plate supporting rollers.

Changes between input and output shaft speeds result from positioning of the cooperating pairs of arms to vary the distance between the axis of arm rotation and the driven end of the reciprocating gear plate. Positioning of the oscillating arms by their supporting shift ring in one direction causes arm contact with the gear plate adjacent the arm distal end results in a low ratio (approaching like speeds) between input and output shaft speeds. Conversely, shifting of the arm carrying ring to locate the arm axis of oscillation near the gear plate end results in a high ratio of variance between input and output shaft speeds.

Drive assemblies are powered by the gear plates and include undirectional clutches which drive their respective cluster gears in one direction upon movement of the gear plate in one direction with opposite movement of the gear plate causing the clutch to disengage the cluster gear.

Infinite speed changes are initiated by arcuate positioning of a shifting ring which positions the oscillating arms under load or no-load conditions.

Important objectives of the present transmission include the provision of a mechanical transmission capable of varying input and output shaft speeds in an infinite manner; the provision of a mechanical transmission which utilizes a number of oscillating arms which act as drivers which in turn act on the ends of gear equipped plates to power same and drive remaining gear and clutch components of the transmission; the provision of a mechanical transmission including multiple cams with each cam coupled to a pair of oscillating arms or drivers to induce reciprocal motion in gear equipped plates in contact at their ends with said arms; the provision of a transmission with gear plates having end mounted bearing components each of which ride in surface contact with an arcuate surface formed on each oscillating arm member.

BRIEF DESCRIPTION OF THE DRAWING

In the accompanying drawing:

FIG. 1 is a side elevational view of the present transmission with certain inernal components shown in broken lines;

FIG. 2 is a front elevational view taken from the left side of FIG. 1 with fragments broken away for purposes of illustration;

FIG. 3 is a vertical sectional view taken approximately along line 3—3 of FIG. 1;

FIG. 4 is a vertical sectional view on an enlarged scale taken along line 4—4 of FIG. 3;

FIG. 5 is a vertical sectional view on reduced scale taken along line 5—5 of FIG. 4; and FIG. 6 is a fragmentary vertical sectional view disclosing modified gear plates and arm members.

DETAILED DESCRIPTION OF THE PREFERRED EMBODIMENT

With continuing attention to the drawing wherein applied reference numerals indicate parts similarly hereinafter identified, the reference numeral 1 indicates a powered input shaft suitably journaled within a bearing 2 housed within the face plate 3 of a transmission case or housing at 4. The housing is of cylindrical shape having a back wall at 5. The input and output shafts at 1 and 7 are in axial alignment on an axis X.

With attention to FIG. 2, input shaft 1 supports within the case first and second cams at 8 and 9 diametrically offset from one another from the axis X of shaft 1. Reciprocating means shown as yokes at 11 and 12 are driven respectively by cams 8 and 9 with each yoke having outward extensions at 11A and 12A shown in horizontal and vertical disposition. At the outer ends of the yoke extensions are bosses 11B and 12B within which are journaled posts P carried by later described oscillating arm members. Rotation of input shaft 1 accordingly drives follower yoke 11 in a horizontally reciprocal manner while cam 9 reciprocates follower yoke 12 along a vertical path.

Indicated at 14 and 16 is a first pair of oscillating arms driven by follower yoke 11. A second pair of oscillating arms at 15 and 17 is driven by second follower yoke 12. The arms are mounted on spindles at 18–20 and 21–23 with the spindles in turn carried by an arm member shift plate 24. From this it will be seen that the first pair of arms 14 and 16 will swing respectively about the axes of spindles 18 and 20, while the second pair of arms at 15 and 17 will swing in oscillating fashion about the axes of spindles 21 and 23 in response to reciprocating travel of the follower yokes. Annular shift plate 24 is confined for arcuate positioning within the transmission housing and arcuately positionable by means of a shift lever at 25 coupled to transmission control means at C. Positioning of the shift plate and hence the spindles thereon will cause the oscillating arms 14, 16 and 15, 17 to be repositioned relative the ends of later described elongate gear plates. The oscillating arms 14, 16 and 15, 17 are each configured so as to have an inwardly facing curved surface area as at 14A, 16A and 15A, 17A which are in moving abutment with the later described gear plates.

With attention to FIG. 3, gear plates at 26 and 27 are in perpendicular relationship and driven in horizontal and vertical paths respectively by the oscillating pairs of arms 14, 16 and 15, 17. With continuing attention to the gear plates, it will be seen that plate 26 is equipped with parallel exterior gear racks at 28 and 30 while vertically disposed gear plate 27 is likewise equipped with gear racks 29 and 31. The elongate gear plates terminate at their ends in radiused surfaces at 26A, 26B and 27A, 27B for driven engagement with abutting arm surfaces 14A, 16A and 15A, 17A. Gear plates 26 and 27 may be suitably equipped at their ends with roller bearings for friction reducing purposes.

With joint attention now to FIGS. 3 and 4, it will be seen that the gear plates are entrained for reciprocal motion on roller guides with gear plate 26 defining a lengthwise opening 32 in which is disposed a pair of the rollers at 34 and 36. Lengthwise opening 33 in gear plate 27 also receives a pair of rollers at 35 and 37 which constrain the gear plate for vertical travel induced by the oscillating arms. Rollers 34, 36 and 35, 37 are bearing mounted on shafts 40, 42 and 41, 43 which are mutually supported by front and rear fixed plates 44 and 45.

Each shaft 40 through 43 additionally carries a drive assembly having gears at 46, 48 and 47, 49. Gears 46 and 48 are paired to be in mesh with gear racks 28 and 30 on gear plate 26, while gears 47 and 49 are in paired mesh with gear racks 29 and 31 on gear plate 27. Accordingly, linear movement of each gear plate will impart rotation to the two drive assembly gears enmeshed therewith.

With attention to FIGS. 4 and 5, it will be seen that the pairs of drive assembly gears driven by each gear plate are individually coupled via a unidirectional clutch at 50, 52 and 51, 53 to clutch driven cluster gears 54, 56 and 55, 57 arranged in cluster fashion about a driven gear 58 keyed in place on output shaft 7. Accordingly, movement of a gear plate in one direction will cause the unidirectional clutches to impart rotary motion to their respective cluster gear in one direction with opposite travel of the gear plate causing both unidirectional clutches to overrun. One suitable type of clutch is termed a unidirectional clutch equipped with roller bearings which are displaced outwardly by radially inclined surface for clutch engagement during clutch member rotation in one direction with rotation of said member in an opposite direction permitting the roller bearings to disengage the cluster gear inner periphery to permit overrunning of the cluster gear.

A rectangular area is defined at the intersection of gear plates 26 and 27 and specifically their openings 32 and 33 with said area serving to receive a block 60 of a thickness so as to substantially fully occupy the plate defined area. The block is stationary to reason of being confined against vertical movement by gear plate 26 and similarly confined against horizontal movement by gear plate 27.

Input and output shaft ends may be journaled within said block with the putput shaft being additionally supported by a bearing assembly 61 confined within a bearing cup 62 formed integral with fixed plate 45. Bearing cup 62, plate 45 and shafts 40 through 43 are retained against rotational displacement about axis X by a locking ring 63 seated within a bearing cup groove 64. The input and output shafts are suitably sealed to prevent the loss of lubricant from the transmission case.

In operation, torque imparted to input shaft 1 from a power source imparts orbital movement to cams 8 and 9 to reciprocate their associated yoke structures which cause arms 14, 16 and 15, 17 to swing about their respective spindles 18, 20 and 21, 23. The gear plates 26 and 27, each interposed between a pair of cooperating arm members, will be driven by the arm members in a rectilinear manner. The stroke of each gear plate is determined by the proximity of the gear plate ends to the spindle axis of the two arms acting on the plates opposite ends. Such proximity may be varied by arcuate positioning of annularly shaped shift ring 24 in response to movement of transmission control C. Accordingly, a low ratio approximately one-to-one occurs when the gear plate ends being driven by the distal ends of the oscillating arms and, conversely, a speed reduction occurs in output shaft 7 as the spindles axes of arm oscillation are repositioned by the shift plate toward the gear plate ends. With attention to FIG. 2, the broken line position of the arm members indicates a partial speed reducing condition of the transmission. A neutral position with no rotation of output shaft 7 occurs upon shift ring 24 being arcuately positioned to the extent the axes of the spindles 18, 20 and 21,23 are in a plane containing respectively the axes of gear plate 26 and gear plate 27. To permit such positioning of the spindles, the arm surfaces 14A, 16A and 15A, 17A must extend to the proximity of the spindle axes.

In FIG. 6, I show a modified gear plate and arm member arrangement wherein prime reference numerals are applied to parts earlier identified by a corresponding reference numeral. An arm member shift plate 24' is confined within a cylindrical housing 4' and equipped with a control lever 25'. Modified intersecting gear plates at 26' and 27' each include a bearing member as at 66 and 67 which are movably carried within the ends of their respective gear plates as typically shown in FIG. 6. The gear plates are recessed at 68 and 69 at their ends to receive the curved surfaces 66A and 67A of their respective bearing members. The unseen ends of the gear plates are likewise equipped for cooperation with oscillating arm members in paired relationship with arm members 14' and 17'. Curved arm surfaces at 14A' and 17A' are formed concentric with the center of shift plate 24'. Adjacent each arm member end is a post P'. Each oscillating arm member is further provided with a lengthwise extending shoulder at 70 and 71 to contribute to oscillating engagement with the gear plate end mounted bearing members. Speed changes by arcuate movement of shift plate 24' results in repositioning of the oscillating arm member spindles 18' and 23', arms 14' and 17' and the yoke extension 11A' and 12A' about the transmission center. During such respositioning, the arm members and specifically curved arm surfaces 14A' and 17A' will slide past the end mounted gear plate bearing members to effect a speed reduction between input and output shafts with a neutral position or no rotation of output shaft 7 occurring upon the axes of the arm spindles coming into a plane containing the medial axis of its associated gear plate. The latter described gear plate and arm arrangement are components of the preferred embodiment of the transmission.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A power transmission including,
   a case,
   an input shaft journalled in said case,
   cam means driven by said shaft,
   an output shaft also journalled in said case and in alignment with said input shaft,
   reciprocating means driven by said cam means,
   an arm member shift plate, arm members swingably mounted on said shift plate and coupled to said reciprocating means whereby oscillating motion is imparted to a pair of said arms,
   elongate gear plates having parallel gear racks thereon with each gear plate disposed intermediate a pair of arm members so as to be driven in a reciprocating manner by said pair of arms,
   paired drive assemblies driven by each of said gear plates and each of said assemblies including a driven gear enmeshed with and driven by a gear rack on one of said gear plates, a driving gear enmeshed with an output shaft mounted gear, clutch means coupling said driven gear to said driving gear and operable to impart rotation to said driving gear of each drive assembly coincident with driven gear rotation in one direction and to overrun during opposite rotation of said driven gear whereby torque is imparted to the output shaft alternately by the driving gears of the drive assemblies, and
   said shift plate adapted for positioning relative said gear plates whereby the point of contact between said arm members and their respective gear plates may be varied with respect to the axis of arm oscillation to vary the magnitude of gear plate travel and hence the speed of the output shaft.

2. The power transmission claimed in claim 1 wherein said gear plates define elongate openings, roller means disposed within said openings and constraining each of said gear plates for rectilinear travel.

3. The power transmission claimed in claim 2 wherein each of said arm members has a curved surface for gear plate contact.

4. The power transmission claimed in claim 1 wherein said shift plate is rotatably confined within said case, control means coupled to said carrier plate for arcuately positioning same to vary transmission output shaft speed.

5. In a power transmission having aligned input and output shafts and reciprocating means powered by cam means, the improvement comprising,
   pairs of oscillating arm members coupled to said reciprocating means,
   gear plates with parallel rack gears thereon with each gear plate driven in a reciprocating manner by a pair of said oscillating arm members,
   pairs of drive assemblies with each assembly having a driven gear in mesh with one of said gear plates and a driving gear in mesh with a gear equipped output shaft, each of said drive assemblies further including clutch means operable to impart rotation to the output shaft during travel of a gear plate in one direction and to overrun during gear plate travel in an opposite direction, and
   an arm member shift plate rotatably positionable to position the oscillating arm members relative said gear plates whereby the plate stroke may be varied by varying the point of arm member-to-gear plate contact.

6. The improvement claimed in claim 5 wherein each of said gear plates defines an elongate opening, roller means in each elongate opening whereby each gear plate is constrained for rectilinear movement.

7. The improvement claimed in claim 5 wherein each of said arm members has a curved surface in movable abutment with a gear plate end.

8. The improvement claimed in claim 6 wherein each of said oscillating arm members has a curved surface passing through the axis of arm oscillation, said gear plates include bearing members one each at a gear plate end and in contact with a curved surface of an oscillating arm member.

9. The improvement claimed in claim 8 wherein said bearing members are rotatable relative their gear plate end for purposes of surfacial contact with the oscillating arm member curved surface.

10. The improvement claimed in claim 9 wherein said bearing members are of generally semi-circular configuration.

11. The power transmission claimed in claim 3 wherein elongate gear plates include bearing members one each at their ends in contact with an arm member curved surface, the curved surface of each arm member passing through the axis of arm oscillation.

12. The power transmission claimed in claim 11 wherein said gear plate bearing members are movable relative the gear plate end for purposes of providing surfacial contact with a curved arm surface.

13. The power transmission claimed in claim 12 wherein said bearing members are generally of semi-circular configuration and rotatably mounted in the gear plate end.

* * * * *